UNITED STATES PATENT OFFICE.

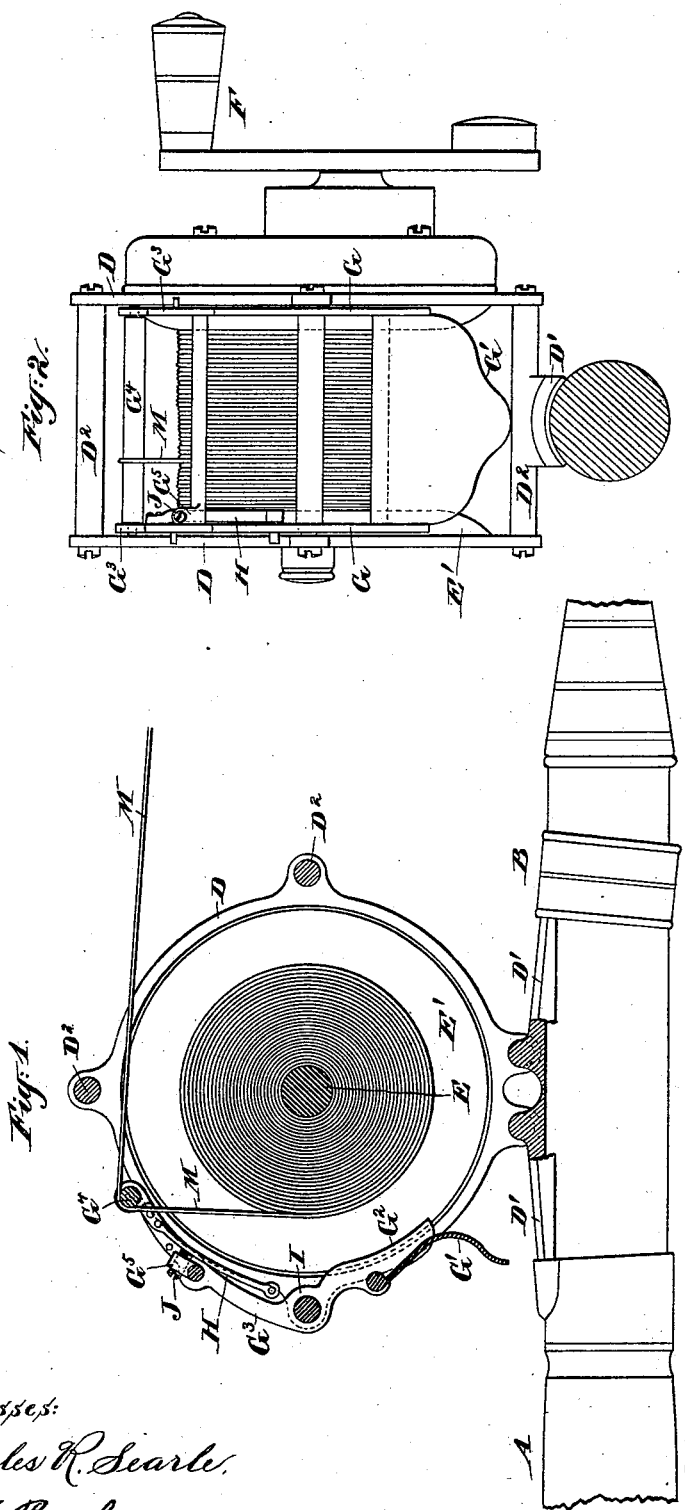

ALPHONSO F. BOARDMAN, OF BROOKLYN, NEW YORK.

FISHING-REEL.

SPECIFICATION forming part of Letters Patent No. 506,094, dated October 3, 1893.

Application filed January 18, 1893. Serial No. 458,752. (No model.)

*To all whom it may concern:*

Be it known that I, ALPHONSO F. BOARDMAN, a citizen of the United States, residing in Brooklyn, Kings county, in the State of New York, have invented a certain new and useful Improvement in Fishing-Reels, of which the following is a specification.

The improvement relates to the brake and the means for operating it.

The object of the invention is to provide for conveniently applying the strong pressure of the brake at an early stage in the operation of "casting," relieving the brake from pressure during the period while the line is being thrown out and automatically applying a gentle pressure sufficient to arrest the spool and prevent over-running when the hook strikes the water at the termination of the cast. The brake acts directly on the rims of the spool.

The accompanying drawings form a part of this specification and represent what I consider the best means of carrying out the invention.

Figure 1 is a side elevation of the reel, with a cross-section of the rod to which it is attached. Fig. 2 is a section through the reel at right angles to the axis.

Similar letters of reference indicate corresponding parts in both the figures where they appear.

A is a portion of the rod, B the ordinary bands and D ordinary reel framing of the "raised pillar" style.

E is the spool, and F the crank which turns the spool through suitable gearing, not shown. The gearing may be that set forth in the patent to me dated January 26, 1892, No. 467,714.

D' D' are the "feet" by which the reel is engaged detachably to the rod by means of the bands B in the ordinary and long approved manner.

$D^2$ are the pillars which connect the two sides of the framing D.

G is the brake-lever, turning on a center I formed by one of the pillars, and G' is a thumb-piece conveniently attached, by which it may be strongly operated when required, and caused to press the brake surfaces $G^2$ on the rims E' of the spool. When the thumb-piece is relieved from pressure the brakes are applied only by the force of a gentle spring H, and the spool is relatively free to turn. I provide for adjusting the force of such spring. The lever G is extended beyond the fulcrum I as shown by $G^3$. The extreme ends are connected by a cross-bar $G^4$, which performs important functions, as will presently appear. The spring H, riveted or otherwise rigidly secured to one of the arms $G^3$ of the brake-lever near its outer end, extends backward nearly but not quite to the fulcrum of the lever and pressing inward and finding an abutment on the rim of the framing, urges the upper end $G^3$ of the brake-lever upward or outward from the spool. This spring gives the brake-lever a gentle tendency to turn and apply the brakes, but with capacity to yield to sufficient pressure and allow the brake to be taken off entirely. When the thumb is applied strongly on the thumb-piece G' the brake is applied with the considerable force required at certain periods in playing a fish, and in strongly moving the rod preliminary to making a cast. When at the proper stage in each cast the operator lets the thumb slip off from the thumb-piece, leaving the brake-lever free, and the line M commences to run out by its momentum, it is desirable to let the line run with freedom while it is being projected endwise through the air. But such movement involves the rapid revolution of the spool in allowing the line to run out, and as soon as the cast is complete and the further movement of the line is arrested by striking the water, it is important to stop the revolutions of the spool and prevent over-running the line, and the liability to entanglement of the line which is uselessly unreeled. I provide for thus arresting automatically. The line M in running out from the spool is led over the cross-bar $G^4$, and the pressure exerted by the line thereon in running out holds down that end of the lever against the force of the spring H. As soon as the line stops running the pressure thereof on the cross-bar $G^4$ is relaxed, the spring asserts itself and the brake is applied with gentle force sufficient to arrest the spool and prevent serious over-running. A screw J, tapped through a lug $G^5$, presses with its point on the mid-length of the spring H, and by turning this screw in one direction or the other the force of the spring may be varied. Turning this screw inward so as to increase the force of the spring applies the brake automatically with more force. Turning the screw in the reverse direction relaxes the force of the spring H and requires less tension on the line M to properly run out when required in the cast. I reduce the friction and wear on the line by making the cross-bar $G^4$ a loose roller K. The line M may run freely over any part of this roller according as it is being drawn off from one part or the other of the spool.

It is not necessary with my invention for the operator to pay the usual attention and apply pressure to the thumb-piece $G'$, as usual when the line strikes the water, but if he chooses to do so there is no objection provided he does not operate too soon; the spool will, with skillful aid thus applied, be more rapidly arrested at the proper time.

I claim as my invention—

1. In a fishing reel the lever G, having the brake surfaces $G^2$, and thumb-piece $G'$ arranged to apply the brake by the action of the thumb, in combination with the frame D carrying the fulcrum I, and with the spool F and spring H arranged as shown so as to exert a gentle force tending to apply the brake to the spool rim at all times, as herein specified.

2. In a fishing reel the lever G, having the brake surfaces $G^2$ and thumb-piece $G'$, in combination with each other the frame D carrying the fulcrum I and with the spool F and spring H arranged as shown so as to exert a gentle force tending to apply the brake at all times to the rim of the spool, and the lug $G^5$ and screw J for allowing the force of the spring to be adjusted as herein specified.

3. In a fishing reel the lever G having the brake-surfaces $G^2$, and thumb-piece $G'$, in combination with the frame D carrying the fulcrum I and with the spool F and spring H arranged as shown so as to exert a gentle force tending to apply the brake at all times to the rim of the spool, and the roller $G^4$ or cross-bar K carried on the extension $G^3$ subject to the pressure of the line, so that the running out of the line M will take off the brake, and the ceasing of the line to run out will automatically apply the brake all substantially as herein specified.

In testimony that I claim the invention above set forth I affix my signature in presence of two witnesses.

ALPHONSO F. BOARDMAN.

Witnesses:
CHARLES R. SEARLE,
M. F. BOYLE.